(12) United States Patent
Venkataraman et al.

(10) Patent No.: US 11,309,563 B2
(45) Date of Patent: Apr. 19, 2022

(54) HIGH EFFICIENCY FUEL CELL SYSTEM WITH HYDROGEN AND SYNGAS EXPORT

(71) Applicant: FuelCell Energy, Inc., Danbury, CT (US)

(72) Inventors: Ramakrishnan Venkataraman, Danbury, CT (US); Mohammad Farooque, Marlboro, NJ (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 16/095,288

(22) PCT Filed: Apr. 20, 2017

(86) PCT No.: PCT/US2017/028658
§ 371 (c)(1),
(2) Date: Oct. 19, 2018

(87) PCT Pub. No.: WO2017/184877
PCT Pub. Date: Oct. 26, 2017

(65) Prior Publication Data
US 2019/0140298 A1    May 9, 2019

Related U.S. Application Data

(60) Provisional application No. 62/336,094, filed on May 13, 2016, provisional application No. 62/325,780, filed on Apr. 21, 2016.

(51) Int. Cl.
*H01M 8/0656* (2016.01)
*H01M 8/0662* (2016.01)
(Continued)

(52) U.S. Cl.
CPC ..... *H01M 8/0681* (2013.01); *H01M 8/04014* (2013.01); *H01M 8/04089* (2013.01);
(Continued)

(58) Field of Classification Search
CPC .......... H01M 8/0681; H01M 8/04014; H01M 8/04089; H01M 8/04291
See application file for complete search history.

(56) References Cited

U.S. PATENT DOCUMENTS 4,620,914 A    11/1986   Abens et al.
5,198,311 A     3/1993   Nakazawa et al.
(Continued)

FOREIGN PATENT DOCUMENTS

CN       101529632 A    9/2009
EP       1 577 972 A1   9/2005
(Continued)

OTHER PUBLICATIONS

2nd International Workshop, Durability and Degradation Issues in PEM Electrolysis Cells and its Components, "Lifetime Prediction of PEM Water Electrolysis Stacks Coupled with RES", Freiburg, Germany, Feb. 2016.
(Continued)

*Primary Examiner* — Ula C Ruddock
*Assistant Examiner* — Thomas H. Parsons
(74) *Attorney, Agent, or Firm* — Foley & Lardner LLP

(57) ABSTRACT

A fuel cell system includes at least one topping fuel cell module including a topping anode portion configured to output a topping anode exhaust, and a topping cathode portion configured to output a topping cathode exhaust; at least one bottoming fuel cell module including a bottoming anode portion configured to output a bottoming anode exhaust, and a bottoming cathode portion configured to output a bottoming cathode exhaust; and an electrochemical hydrogen separation unit configured to receive at least a portion of the topping anode exhaust, to output a hydrogen-rich stream, and to output a $CO_2$-rich stream. The bottoming (Continued)

US 11,309,563 B2

Page 2 anode portion is configured to receive the $CO_2$-rich stream from the electrochemical hydrogen separation unit.

20 Claims, 4 Drawing Sheets

(51) Int. Cl.
H01M 8/0668 (2016.01)
H01M 8/04089 (2016.01)
H01M 8/04746 (2016.01)
H01M 8/04701 (2016.01)
H01M 8/04291 (2016.01)
H01M 8/04828 (2016.01)
H01M 8/04014 (2016.01)
H01M 8/0612 (2016.01)
H01M 8/249 (2016.01)

(52) U.S. Cl.
CPC ... H01M 8/04097 (2013.01); H01M 8/04291 (2013.01); H01M 8/04701 (2013.01); H01M 8/04746 (2013.01); H01M 8/04753 (2013.01); H01M 8/04761 (2013.01); H01M 8/04828 (2013.01); H01M 8/0612 (2013.01); H01M 8/0656 (2013.01); H01M 8/0668 (2013.01); H01M 8/249 (2013.01)

(56) References Cited

U.S. PATENT DOCUMENTS

| | | | |
|---|---|---|---|
| 5,221,586 A * | 6/1993 | Morimoto | H01M 8/04089 429/415 |
| 5,306,577 A | 4/1994 | Sprouse | |
| 5,376,470 A | 12/1994 | Sprouse | |
| 5,413,878 A | 5/1995 | Williams et al. | |
| 5,506,066 A | 4/1996 | Sprouse | |
| 5,518,828 A | 5/1996 | Senetar | |
| 5,541,014 A | 7/1996 | Micheli et al. | |
| 5,658,448 A | 8/1997 | Lasich | |
| 6,211,643 B1 | 4/2001 | Kagatani | |
| 6,280,865 B1 | 8/2001 | Eisman et al. | |
| 6,365,290 B1 | 4/2002 | Ghezel-Ayagh et al. | |
| 6,475,655 B1 | 11/2002 | Nakanishi et al. | |
| 6,495,025 B2 | 12/2002 | Velev | |
| 6,516,905 B1 | 2/2003 | Baumert et al. | |
| 6,569,298 B2 | 5/2003 | Merida-Donis | |
| 7,150,927 B2 | 12/2006 | Hickey et al. | |
| 7,201,979 B2 | 4/2007 | McElroy et al. | |
| 7,364,810 B2 | 4/2008 | Sridhar et al. | |
| 7,422,810 B2 | 9/2008 | Venkataraman et al. | |
| 7,431,746 B2 | 10/2008 | Ma et al. | |
| 7,482,078 B2 * | 1/2009 | Sridhar | C01B 3/34 429/418 |
| 7,575,822 B2 | 8/2009 | Mitlitsky et al. | |
| 7,704,618 B2 | 4/2010 | Venkataraman et al. | |
| 7,781,112 B2 | 8/2010 | Sridhar et al. | |
| 7,833,668 B2 | 11/2010 | Ballantine et al. | |
| 7,846,599 B2 | 12/2010 | Ballantine et al. | |
| 7,878,280 B2 | 2/2011 | Sridhar et al. | |
| 7,887,971 B2 | 2/2011 | Hickey et al. | |
| 7,901,814 B2 | 3/2011 | Venkataraman et al. | |
| 8,053,136 B2 | 11/2011 | Hickey et al. | |
| 8,062,799 B2 * | 11/2011 | Jahnke | H01M 8/04291 429/415 |
| 8,071,241 B2 | 12/2011 | Sridhar et al. | |
| 8,071,246 B2 | 12/2011 | Mitlitsky et al. | |
| 8,080,344 B2 | 12/2011 | Skok et al. | |
| 8,236,458 B2 | 8/2012 | Jahnke et al. | |
| 8,277,992 B2 | 10/2012 | Mitlitsky et al. | |
| 8,288,888 B2 | 10/2012 | Hinatsu et al. | |
| 8,367,256 B2 | 2/2013 | Jahnke et al. | |
| 8,435,689 B2 | 5/2013 | Venkataraman | |
| 8,663,859 B2 | 3/2014 | Mitlitsky et al. | |
| 8,852,820 B2 | 10/2014 | Perry et al. | |
| 9,133,553 B2 | 9/2015 | Wilson et al. | |
| 9,187,833 B2 | 11/2015 | Wilson et al. | |
| 9,190,693 B2 | 11/2015 | Sridhar et al. | |
| 9,249,518 B2 | 2/2016 | Hinatsu et al. | |
| 9,303,325 B2 | 4/2016 | Hinatsu et al. | |
| 9,413,017 B2 | 8/2016 | Bandhauer et al. | |
| 9,478,819 B2 | 10/2016 | Lambrech et al. | |
| 9,502,728 B1 * | 11/2016 | Farooque | H01M 8/0668 |
| 9,722,273 B2 | 8/2017 | Perry et al. | |
| 9,911,989 B2 | 3/2018 | Mcelroy et al. | |
| 9,947,955 B2 | 4/2018 | Sridhar et al. | |
| 10,096,840 B1 | 10/2018 | Venkataraman et al. | |
| 10,581,090 B2 | 3/2020 | Ballantine et al. | |
| 10,631,442 B2 | 4/2020 | Lecourtier | |
| 2001/0036566 A1 | 11/2001 | Dekker et al. | |
| 2002/0153263 A1 | 10/2002 | Velev | |
| 2003/0207161 A1 | 11/2003 | Rusta-Sallehy et al. | |
| 2004/0023097 A1 | 2/2004 | Bette et al. | |
| 2004/0131902 A1 | 7/2004 | Frank et al. | |
| 2004/0142215 A1 | 7/2004 | Barbir et al. | |
| 2004/0205032 A1 | 10/2004 | Routtenberg et al. | |
| 2004/0229092 A1 | 11/2004 | Take | |
| 2005/0164069 A1 | 7/2005 | Margiott et al. | |
| 2005/0227137 A1 | 10/2005 | Suga | |
| 2006/0228593 A1 | 10/2006 | Grieve et al. | |
| 2008/0236647 A1 | 10/2008 | Gibson et al. | |
| 2008/0248349 A1 | 10/2008 | McElroy et al. | |
| 2009/0246564 A1 | 10/2009 | Mogi et al. | |
| 2010/0114395 A1 | 5/2010 | Hinatsu et al. | |
| 2010/0216039 A1 | 8/2010 | Jahnke et al. | |
| 2010/0266923 A1 | 10/2010 | Mcelroy et al. | |
| 2011/0189567 A1 | 8/2011 | Venkataraman et al. | |
| 2012/0034538 A1 | 2/2012 | Jahnke et al. | |
| 2013/0130139 A1 | 5/2013 | Kah et al. | |
| 2014/0311917 A1 * | 10/2014 | Tamhankar | C01B 3/36 205/637 |
| 2014/0349144 A1 | 11/2014 | Kim et al. | |
| 2014/0352309 A1 | 12/2014 | Kim et al. | |
| 2015/0134277 A1 | 5/2015 | Van Doorn | |
| 2015/0285141 A1 | 10/2015 | Manabe et al. | |
| 2016/0181647 A1 | 6/2016 | Lambrech et al. | |
| 2020/0161671 A1 | 5/2020 | Ballantine et al. | |

FOREIGN PATENT DOCUMENTS

| | | |
|---|---|---|
| EP | 1 620 906 | 2/2006 |
| EP | 1 665 441 | 6/2006 |
| EP | 1 750 321 A1 | 2/2007 |
| EP | 2 790 256 A1 | 10/2014 |
| JP | 61-085773 A | 5/1986 |
| JP | 05-129033 A | 5/1993 |
| JP | 10-199548 A | 7/1998 |
| JP | 2007-505467 A | 3/2007 |
| JP | 2007-115696 A | 5/2007 |
| JP | 2008-522942 A | 7/2008 |
| JP | 2009-537954 A | 10/2009 |
| KR | 1020090104548 A | 10/2009 |
| KR | 20110064723 A | 6/2011 |
| KR | 20150020463 A | 2/2015 |
| WO | WO-2004/013924 A2 | 2/2004 |
| WO | WO-2012/176176 A1 | 12/2012 |
| WO | WO-2014/140962 A1 | 9/2014 |
| WO | WO-2017/184877 A1 | 10/2017 |

OTHER PUBLICATIONS

Communication pursuant to Rule 164(1) EPC in EP 15871189 dated Jul. 6, 2018 (13 pages).
D. Mears, M. Mann, J. Ivy, M. Rutkowski, "Overview of Central H2A Results," 2004 US Hydrogen Conference Proceedings, Apr. 26-29, 2004.
Extended European Search Report in EP 15871187.9 dated Oct. 17, 2018 (12 pages).
Final Office Action on U.S. Appl. No. 15/449,583 dated Jun. 25, 2019.
International Preliminary Reporton Patentability in PCT/US2017/028658 dated Nov. 1, 2018 (11 pages).

(56) References Cited

OTHER PUBLICATIONS

International Search Report and Written Opinion in PCT/US2015/066735 dated Feb. 12, 2016 (9 pages).
International Search Report and Written Opinion in PCT/US2017/028658 dated Sep. 5, 2017 (14 pages).
International Search Report and Written Opinion in PCT/US2018/020577 dated Jun. 11, 2018 (15 pages).
International Search Report and Written Opinion in PCT/US2018/021357, dated May 30, 2018 (16 pages).
K. Harrison, 228th Electrochemical Society Meeting, "Large Active Area Electrolyzer Stack Test Bed—Design, Data and Development", Phoenix, Arizona, Oct. 2015.
L. Kazmerski, "PV Electrolysis," ASES Renewable Hydrogen Forum Proceedings, Oct. 1, 2003.
M. Peters, Presentation at the ACT Expo, "Renewable Hydrogen Production for Use in Hydrogen Fuel Cell Vehicles," Dallas, Texas, May 5, 2015.
M. Peters, Renewable Electrolysis Integrated System Development & Testing; Jun. 8, 2016 Project ID: PD031.
Pre-Interview First Office Action dated Feb. 12, 2019 in U.S. Appl. No. 15/449,583 (3 pages).
Pre-Interview First Office Action dated Feb. 14, 2019 in U.S. Appl. No. 15/445,875 (3 pages).
Preliminary Rejection in KR2017-7018944 dated Mar. 28, 2019, with English translation (26 pages).
R. McConnell, Generating Hydrogen througn Water Electrolysis Using Concentrator Photovoltaics, Conference Paper NREL/CP-520-37093 Jan. 2005.
S. Licht, "Solar Water Splitting to Generate Hydrogen Fuel: Photothermal Electrochemical Analysis," J. Phys. Chem. B 2003, 107, 4253-4260.
U.S. Office Action on U.S. Appl. No. 14/578,077 dated Jul. 10, 2015 (17 pages).
U.S. Office Action on U.S. Appl. No. 14/578,077 dated Oct. 20, 2015 (18 pages).
W. Summers, "Hydrogen Production Using Nuclear Energy," 15th Annual U.S. Hydrogen Conference Proceedings. Apr. 29, 2004.
First Office Action in CN2015800695728 dated Aug. 28, 2019, with English translation (23 pages).
International Search Report and Written Opinion in PCT/US2018/021357, dated Sep. 10, 2019 (9 pages).

\* cited by examiner

HIGH EFFICIENCY FUEL CELL SYSTEM WITH HYDROGEN AND SYNGAS EXPORT

CROSS-REFERENCE TO RELATED APPLICATIONS

The present application is a U.S. national stage entry of PCT/US2017/028658, filed on Apr. 20, 2017, which claims priority to U.S. Provisional Appl. No. 62/325,780, filed on Apr. 21, 2016, and U.S. Provisional Appl. No. 62/336,094, filed on May 13, 2016, all of which are hereby incorporated by reference in their entireties.

BACKGROUND

This present disclosure relates to multi-stack high efficiency fuel cell system capable of allowing the export of hydrogen and syngas from the anode exhaust of the fuel cell system. The systems of the present disclosure may be used with any types of fuel cells, and particularly with molten carbonate fuel cells and solid oxide fuel cells.

A fuel cell is a device which directly converts chemical energy stored in hydrocarbon fuel into electrical energy by means of an electrical reaction. Generally, a fuel cell comprises an anode and a cathode separated by an electrolyte matrix, which conducts electrically charged ions. In order to produce a useful power level, a number of individual fuel cells are stacked in series with an electrically conductive separator plate between each cell.

In building fuel cell systems, individual fuel cells are stacked together to form a fuel cell stack. The number of fuel cells determines the power rating of the fuel cell stack. To provide systems with higher power ratings, a number of fuel cell stacks are utilized and the outputs of the fuel cell stacks are combined to provide the desired power output. In certain fuel cell systems, the fuel cell stacks may be organized in one or more fuel cell stack modules, each of which includes one or more fuel cell stacks housed in an enclosure or a containment structure.

A multi-stack fuel cell system may include a fuel cell stack module with multiple fuel cell stacks housed within a common enclosure. In a system of this design developed for high temperature fuel cell stacks and, in particular, for molten carbonate fuel cell (MCFC) stacks, a box-like containment structure is employed as the enclosure and the fuel cell stacks may be arranged along the length of the containment structure. Each fuel cell stack within the fuel cell module may have inlet manifolds for receiving fuel and oxidant gases needed to operate the fuel cell stack and outlet manifolds for conveying spent fuel and oxidant gases as anode and cathode exhausts from the fuel cell stack. The containment structure of the fuel cell module includes fuel and oxidant gas inlet ports that communicate through ducts with the respective fuel and oxidant gas inlet manifolds of the fuel cell stacks, and fuel and oxidant gas outlet ports that communicate through ducts with the oxidant and fuel gas outlet manifolds.

In internally reforming fuel cells, a reforming catalyst is placed within the fuel cell stack to allow direct use of hydrocarbon fuels such as pipe line natural gas, liquefied natural gas (LNG), liquefied petroleum gas (LPG), bio-gas, methane containing coal gas, etc., without the need for expensive and complex external reforming equipment. In an internal reformer, water and heat produced by the fuel cell are used by the reforming reaction, and hydrogen produced by the reforming reaction is used in the fuel cell. The heat produced by the fuel cell reaction supplies heat for the endothermic reforming reaction. Thus, internal reforming is used to cool the fuel cell stack.

Two different types of internally reforming fuel cell designs have been developed and used. The first type of an internally reforming fuel cell is a Direct Internally Reforming (DIR) fuel cell module, in which direct internal reforming is accomplished by placing the reforming catalyst within an active anode compartment of the fuel cell. A second type of internally reforming fuel cell utilizes Indirect Internal Reforming (IIR), which is accomplished by placing the reforming catalyst in an isolated chamber within the fuel cell stack and routing the reformed gas from this chamber into the anode compartment of the fuel cell. An internally reforming MCFC system, also called Direct Fuel Cell (DFC), which incorporates both DIR and IIR, has evolved as the choice for environmentally friendly power generation and is the leading commercial option for green power. Carbonate power plants have lower emissions of greenhouse gases and particulate matter than conventional combustion-based power plants. Carbonate power plants emit little NOx gas, SOx gas, or particulate matter. Carbonate power plants have been designated "ultra-clean" by the California Air Resources Board (CARB).

SUMMARY

In one embodiment, a fuel cell system comprises at least one topping fuel cell module comprising a topping anode portion configured to output a topping anode exhaust, and a topping cathode portion configured to output a topping cathode exhaust; at least one bottoming fuel cell module comprising a bottoming anode portion configured to output a bottoming anode exhaust, and a bottoming cathode portion configured to output a bottoming cathode exhaust; and an electrochemical hydrogen separation unit configured to receive at least a portion of the topping anode exhaust, to output a hydrogen-rich stream, and to output a $CO_2$-rich stream. The bottoming anode portion is configured to receive the $CO_2$-rich stream from the electrochemical hydrogen separation unit.

In one aspect of this embodiment, the system further comprises a water recovery unit configured to receive the topping anode exhaust, to separate water contained in the topping anode exhaust, to output a water stream, and to output water-depleted topping anode exhaust. The at least a portion of the topping anode exhaust received by the electrochemical hydrogen separation unit is the water-depleted topping anode exhaust from the water recovery unit.

In one aspect of this embodiment, the system further comprises a controller configured to control an amount of the topping anode exhaust that is diverted to the electrochemical hydrogen separation unit.

In one aspect of this embodiment, the electrochemical hydrogen separation unit is configured to receive an entirety of the topping anode exhaust from the at least one topping fuel cell module.

In one aspect of this embodiment, the system further comprises a heat recovery unit configured to: receive the topping cathode exhaust and an incoming water stream, heat the incoming water stream using heat in the topping cathode exhaust, and output a hot water stream.

In one aspect of this embodiment, the system further comprises an Organic Rankine Cycle system configured to receive the topping cathode exhaust, and to generate power using heat in the topping cathode exhaust.

In one aspect of this embodiment, a total number of topping fuel cell stacks in the system is greater than a total number of bottoming fuel cell stacks in the system.

In another embodiment, a method comprises operating a fuel cell system that comprises: at least one topping fuel cell module comprising a topping anode portion configured to output a topping anode exhaust, and a topping cathode portion configured to output a topping cathode exhaust, at least one bottoming fuel cell module comprising a bottoming anode portion configured to output a bottoming anode exhaust, and a bottoming cathode portion configured to output a bottoming cathode exhaust, and an electrochemical hydrogen separation unit. The step of operating the fuel cell system comprises: at the electrochemical hydrogen separation unit, receiving at least a portion of the topping anode exhaust from the at least one topping fuel cell module, outputting a hydrogen-rich stream, and outputting a $CO_2$-rich stream; and at the bottoming anode portion of, receiving the $CO_2$-rich stream from the electrochemical hydrogen separation unit.

In another embodiment, a fuel cell system comprises at least one topping fuel cell module comprising a topping anode portion configured to output a topping anode exhaust, and a topping cathode portion configured to output a topping cathode exhaust; at least one bottoming fuel cell module comprising a bottoming anode portion configured to receive the topping anode exhaust and to output a bottoming anode exhaust, and a bottoming cathode portion configured to output a bottoming cathode exhaust; and a $CO_2$ separation assembly configured to receive the bottoming anode exhaust, to output a hydrogen-rich stream, and to output a $CO_2$-rich stream.

In one aspect of this embodiment, the system further comprises a condenser configured to receive the bottoming anode exhaust, to separate water contained in the bottoming anode exhaust, to output a water stream, and to output water-depleted bottoming anode exhaust. The bottoming anode exhaust received by the $CO_2$ separation assembly is the water-depleted bottoming anode exhaust from the condenser.

In one aspect of this embodiment, the system further comprises a flue gas input configured to receive flue gas from a flue gas generating system and to output the flue gas to the topping cathode portion and the bottoming cathode portion; and a controller configured to control an amount of the flue gas output to the topping cathode portion and the bottoming cathode portion.

In one aspect of this embodiment, the topping anode portion is configured to receive the hydrogen-rich stream from the $CO_2$ separation assembly.

In one aspect of this embodiment, the system further comprises a bleed valve configured to allow a portion of the hydrogen-rich stream from the $CO_2$ separation assembly to be bled off; and a controller configured to control the bleed valve.

In one aspect of this embodiment, the system further comprises a heat recovery unit configured to: receive the topping cathode exhaust, the bottoming cathode exhaust, and an incoming water stream, heat the incoming water stream using heat in the topping cathode exhaust and the bottoming cathode exhaust, and output a hot water stream.

In one aspect of this embodiment, the system further comprises an Organic Rankine Cycle system configured to receive the topping cathode exhaust and the bottoming cathode exhaust, and to generate power using heat in the topping cathode exhaust and the bottoming cathode exhaust.

In one aspect of this embodiment, a total number of topping fuel cell stacks in the system is greater than a total number of bottoming fuel cell stacks in the system.

In another embodiment, a method comprises operating a fuel cell system that comprises: at least one topping fuel cell module comprising a topping anode portion configured to output a topping anode exhaust, and a topping cathode portion configured to output a topping cathode exhaust, at least one bottoming fuel cell module comprising a bottoming anode portion configured to receive the topping anode exhaust and to output a bottoming anode exhaust, and a bottoming cathode portion configured to output a bottoming cathode exhaust, and a $CO_2$ separation assembly. The step of operating the fuel cell system comprises, at the $CO_2$ separation assembly, receiving the bottoming anode exhaust from the at least one bottoming fuel cell module, outputting a hydrogen-rich stream, and outputting a $CO_2$-rich stream.

DETAILED DESCRIPTION

Figure 1:
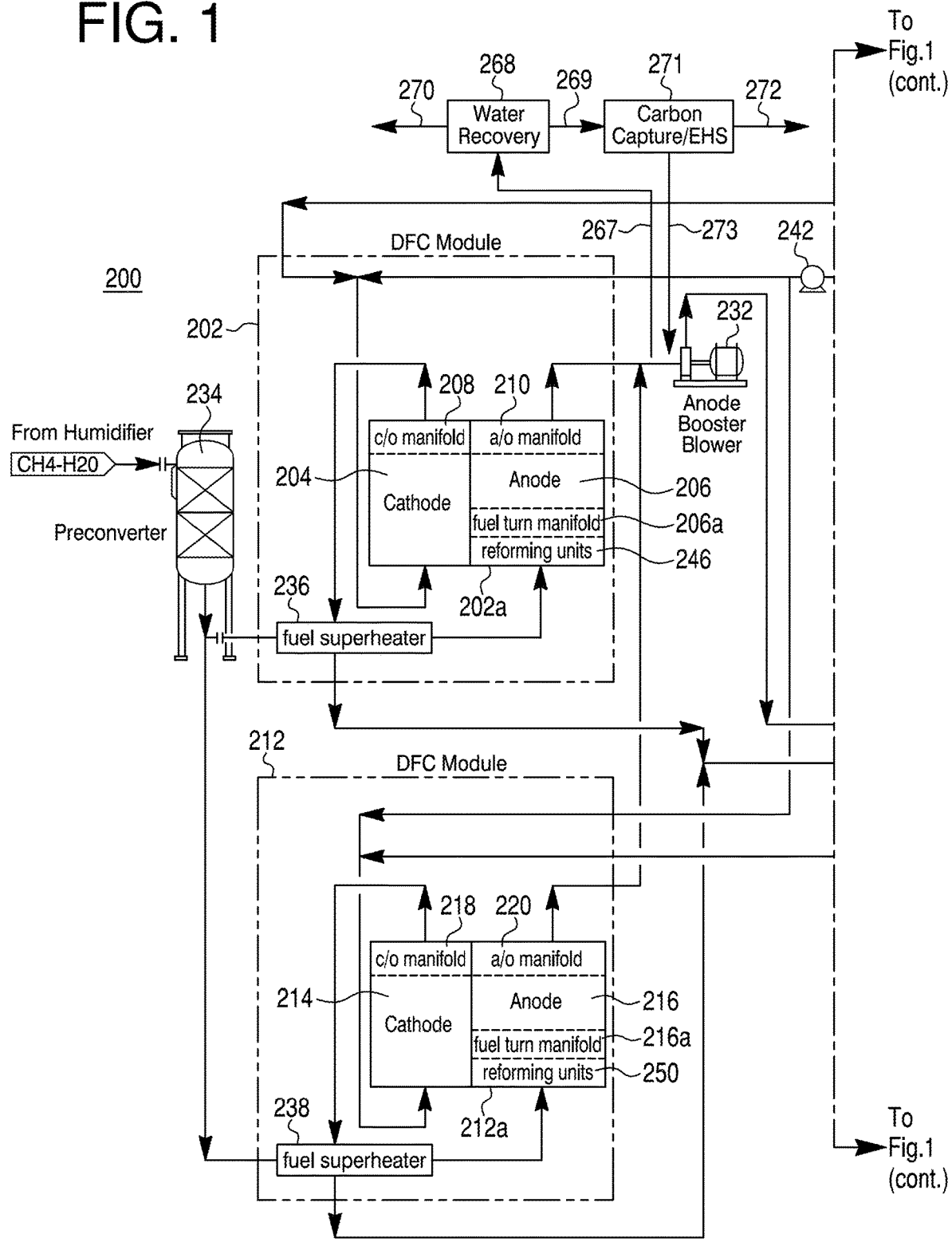
FIG. 1 shows a high efficiency fuel cell system with hydrogen and syngas export according to one embodiment.
Figure 1:
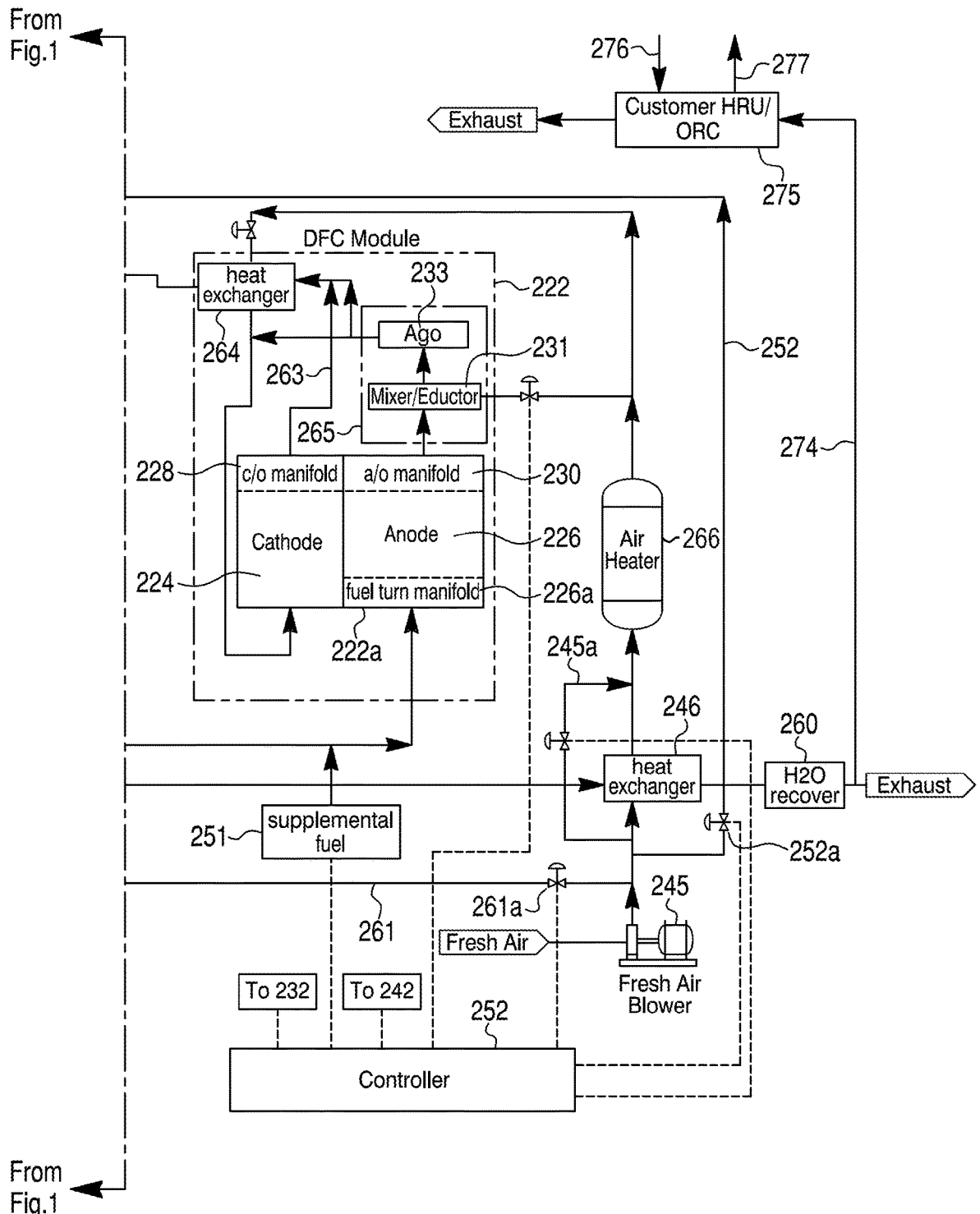

The present disclosure provides a cost-effective, high efficiency fuel cell system, in which exportation of hydrogen and syngas from the exhaust of the anode of a topping module or modules in a high-efficiency fuel cell system is achieved.

More specifically, the present disclosure relates to a high efficiency fuel cell system that is capable of exporting valuable hydrogen and/or syngas from the system for use in other processes and energy production, thus allowing the system to increase its overall power generation. The high efficiency fuel cell system includes topping fuel cell modules and bottoming fuel cell modules arranged in series, where the topping fuel cell modules are present in the system in a greater number than bottoming fuel cell modules such that more fuel is utilized in the topping fuel cell modules than the bottoming fuel cell modules. This allows for a high electrical efficiency to be achieved with the fuel cell system.

During operation, the bottoming fuel cell module receives anode exhaust output from the topping fuel cell modules. The anode exhaust contains unutilized fuel that was inputted into the topping fuel cell modules for electrical production. In order to capture the value of this unutilized fuel, before being introduced into the bottoming fuel cell module, some or all of the anode exhaust is diverted to a water recovery unit and $CO_2$ separation system. The water recovery unit and $CO_2$ separation system condenses out water contained in the anode exhaust and separates out some or all of the carbon dioxide present in the anode exhaust. This results in an output stream being rich in hydrogen and/or syngas, which can be exported from the system for other uses, such as chemical, metallurgical processes, and/or as fuel for fuel cells to generate additional power. The separated carbon dioxide may then be recycled back into the system and introduced into the bottoming fuel cell module for its production needs.

A controller may be provided to control the amount of anode exhaust that is diverted to the water recovery unit and the $CO_2$ separation system. In some embodiments, the full amount of the anode exhaust is diverted to the water recovery unit and the $CO_2$ separation system. This helps in the reduction of energy requirements of the system by allowing the use of a low temperature anode booster blower that conveys the anode exhaust to the bottoming fuel cell modules.

In other embodiments, a hydrogen and/or syngas stream may be exported by diverting the anode exhaust from the bottoming modules after water recovery and $CO_2$ separation instead of recycling the anode exhaust back into the system.

In addition, in some embodiments, a heat recovery unit may be provided. The heat recovery unit may receive cathode exhaust output from the topping and bottoming fuel cell modules. The heat that is present in the cathode exhaust output may be utilized to generate hot water to meet industrial or residential needs. In other embodiments, the cathode exhaust output may be conveyed to an Organic Rankine Cycle (ORC) system, where the heat present in the cathode exhaust output may be used to generate additional power. By utilizing the heat present in the cathode exhaust output, the fuel cell system may achieve a greater thermal efficiency.

First Embodiment

FIG. 1 schematically shows a modular fuel cell system 200 according to one embodiment of the present invention. The fuel cell system 200 is a high efficiency fuel cell system such as the fuel cell systems disclosed in U.S. patent application Ser. No. 14/578,077, filed Dec. 19, 2014, which is incorporated herein by reference in its entirety. As shown in FIG. 1, the system 200 captures carbon dioxide from exhaust generated by the system to allow for the exportation of a highly pure hydrogen stream from the system 200. In addition, the system 200 may improve thermal efficiency by diverting exhaust from the system 200 to a heat recovery unit to produce hot water that can meet industrial or residential needs or to generate power using an Organic Rankine Cycle (ORC) system.

The fuel cell system 200 of FIG. 1 includes a topping fuel cell assembly and a bottoming fuel cell assembly. In FIG. 1, the topping fuel cell assembly includes first and second topping fuel cell modules 202, 212, while the bottoming fuel cell assembly includes a bottoming fuel cell module 222. The first topping fuel cell module 202 comprises one or more first fuel cell stacks 202A. Each fuel cell stack includes two or more fuel cells and a first topping cathode portion 204 and a first topping anode portion 206. Although FIG. 1 shows the first topping fuel cell module 202 as having one fuel cell stack, in some embodiments, the first fuel cell topping module 202 may include two or more fuel cell stacks having similar configurations and being disposed within a common containment structure. The fuel cell stacks in the first topping fuel cell module 202 may include MCFC stacks. In each fuel cell of each fuel cell stack 202A, the first topping cathode portion 204 and the first topping anode portion 206 are separated by molten carbonate electrolyte (not shown) stored in an electrolyte matrix.

In some embodiments, the first topping fuel cell stack 202A may be an internally reforming fuel cell stack and may include direct internal reforming, indirect internal reforming, or a combination of both direct and indirect internal reforming. In the embodiment shown in FIG. 1, the first topping fuel cell stack 202A includes one or more internal reforming units 248 that are configured to receive a portion of the fuel feed and convey reformed or partially reformed fuel, including hydrogen and carbon monoxide, to a fuel turn manifold 206A, which directs the fuel to the first topping anode portion 206 of the cells of the stack where the fuel undergoes an electrochemical reaction with oxidant gas passing through the first topping cathode portion 204. As further shown in FIG. 1, the first topping cathode portion 204 receives oxidant gas provided to the common containment structure through an opening on the containment vessel. The cathode may contain no inlet manifold and the oxidant may enter the stack through openings on the cathode face. However, in other embodiments, the oxidant gas may be supplied to the first topping cathode portion 204 through a cathode inlet manifold (not shown).

As shown in FIG. 1, the first topping cathode portion 204 outputs cathode exhaust to a cathode outlet manifold 208. Cathode exhaust is then conveyed from the cathode outlet manifold 208 via suitable ducting to a heat exchanger 236, which may be provided interior or exterior to the first topping fuel cell module 202. The first topping anode portion 206 conveys anode exhaust to an anode outlet manifold 210. Anode exhaust is then conveyed from the anode outlet manifold 110 of the first topping fuel cell module 202 to the bottoming fuel cell module 222.

The first topping stack 202A may include one or more internal reforming units 248. Hydrogen, carbon dioxide, and carbon monoxide are produced from fuel passing through the one or more internal reforming units 248. Reformed or partially reformed fuel is then supplied to the first topping anode portion 206 of the stack via the fuel turn manifold 206A. In the first topping anode portion 206 of the stack, hydrogen electrochemically reacts to produce water, carbon monoxide either reacts electrochemically to form carbon dioxide or chemically with water to produce hydrogen and carbon dioxide. Direct internal reforming (DIR) may also be provided in each cell of the first topping stack 202A by placing reforming catalyst in one or more anode compartments of the first topping anode portion 206, and in particular, by placing the reforming catalyst in corrugations of an anode current collector of the one or more anode compartments of each cell in the stack.

As discussed above, the first topping fuel cell module 202 may include multiple first topping fuel cell stacks. The number of fuel cell stacks in each fuel cell module may be determined based on the desired power output. The number of fuel cells in each fuel cell stack may be determined by the required output, size and weight of the stacks and ease of transportation. The stacks may be provided vertically, horizontally, or a combination of both.

As shown in FIG. 1, the topping fuel cell assembly of the fuel cell system 200 further includes the second topping fuel cell module 112, which includes one or more second fuel cell stacks. As with the first topping fuel cell module 202, while the second topping fuel cell module 212 is shown with a single fuel cell stack 212A, two or more second topping fuel cell stacks 212A may be included in the second fuel cell module 212 and housed in the same containment structure. The second topping fuel cell stacks in the second topping fuel cell module 212 may comprise high temperature MCFC.

The second topping fuel cell stack 212A includes a second topping cathode portion 214 and a second topping anode portion 216. Each cell of a stack is separated by an electrolyte matrix having molten carbonate electrolyte (not shown). Fuel entering the second topping anode portion 216 is reformed internally to produce partially or fully reformed fuel including hydrogen and carbon monoxide, which then undergoes an electrochemical reaction with oxidant gas passing through the second topping cathode portion 214. In the second topping anode portion 216 of the stack, hydrogen electrochemically reacts to produce water, and carbon monoxide either reacts electrochemically to form carbon dioxide or chemically with water to produce hydrogen and carbon dioxide. The second topping fuel cell stack 212A may include indirect internal reforming, direct internal reforming, or a combination of both direct and indirect internal reforming. In some embodiments, the second topping fuel cell stack 212A may include one or more reforming units 250 configured to receive a portion of the fuel feed and convey reformed or partially reformed fuel, including hydrogen and carbon monoxide, to a fuel turn manifold 216A, which then directs the fuel to the second topping anode portion 216 of the stack where the fuel undergoes the electrochemical reaction with the oxidant gas. As further shown in FIG. 1, the second topping cathode portion 214 receives oxidant gas provided to the common containment structure through an open cathode inlet stack face. However, in other embodiments, the oxidant gas may be supplied to the second topping cathode portion 214 through a cathode inlet manifold (not shown).

As shown in FIG. 1, the second topping cathode portion 214 conveys cathode exhaust to a cathode outlet manifold 218. Cathode exhaust is then output from the cathode outlet manifold 218 via suitable ducting to a heat exchanger 238 which can be provided either inside or outside the second topping fuel cell module 212. The second topping anode portion 216 conveys anode exhaust to an anode outlet manifold 220. Anode exhaust is then conveyed from the anode outlet manifold 220 to outside of the second topping fuel cell module 212 for use in the bottoming fuel cell module 222.

The second topping fuel cell stack 212A may include one or more internal reforming units 250. Hydrogen, carbon dioxide and carbon monoxide are produced from fuel passing through the one or more internal reforming units 250. Reformed or partially reformed fuel is then supplied to the second topping anode portion 216 of the stack via the turn manifold 216A. Direct internal reforming (DIR) may also be provided in the second topping stack 212A by placing reforming catalyst in the one or more anode compartments of the second topping anode portion 216, and in particular, by placing the reforming catalyst in corrugations of an anode current collector of the one or more anode compartments in each cell of the second topping stack 212A.

Similarly, as described above with respect to the first topping fuel cell module 202, the second topping fuel cell module 212 may include multiple second topping fuel cell stacks having similar construction. The number of fuel cell stacks per module may be determined based on the desired power output. The number of fuel cells in each fuel cell stack may be determined by the required output, size and weight of the stacks and ease of transportation.

As shown in FIG. 1, the fuel cell system 200 includes the bottoming fuel cell assembly having the bottoming fuel cell module 222. The bottoming fuel cell module 222 includes one or more fuel cell stacks 222A housed by a common containment structure. Each fuel cell in the bottoming fuel cell stack 222A includes a bottoming cathode portion 224 and a bottoming anode portion 226. Each cell of a stack is separated by an electrolyte matrix having molten carbonate electrolyte (not shown).

The bottoming fuel cell stack 222A may be an internally reforming fuel cell stack and may include direct internal reforming, indirect internal reforming, or a combination of both direct and indirect internal reforming. The bottoming fuel cell stack 222A may include a direct internal reforming catalyst placed in the one or more anode compartments of the bottoming anode portion 226, and in particular, in corrugations of an anode current collector of the one or more anode compartments in each cell of the bottoming fuel cell stack 222A. Although in the embodiment shown in FIG. 1, the bottoming fuel cell stack 222A does not include indirect internal reforming, in other embodiments, the bottoming fuel cell stack may include one or more reforming units for further reforming the anode exhaust received from the first and second topping modules before the reformed anode exhaust is conveyed to the bottoming anode portion 226.

As shown in FIG. 1, the bottoming cathode portion 224 receives oxidant gas, provided to the common containment structure through an open cathode inlet stack face. However, in other embodiments, oxidant gas may be supplied to the bottoming cathode portion 224 through a cathode inlet manifold. The oxidant gas in FIG. 1 includes fresh air which is preheated and supplied to the bottoming cathode portion. A first portion of the preheated fresh air may be combusted with anode exhaust output from the bottoming anode portion in an anode oxidizer assembly 231, 233 to produce heated oxidant gas which is then conveyed to the bottoming cathode portion together with a second portion of the pre-heated fresh air.

The bottoming cathode portion 224 outputs cathode exhaust rich in $CO_2$ into a cathode outlet manifold 228. As shown in FIG. 1, cathode exhaust collected in the cathode outlet manifold 228 is then output from the bottoming fuel cell module 222 to the first and second topping cathode portions 204 and 214 via appropriate ducting 263. In the embodiment of FIG. 1, the cathode exhaust output from the bottoming fuel cell module 222 is split about evenly between the first and second topping cathode portions. However, in other embodiments, the relative amounts of the cathode exhaust provided to the first and second topping cathode portions may be controlled based on desired system operation. Cathode exhaust ducting 263 in the bottoming module also includes a heat exchanger 264 to cool down the cathode exhaust from the bottoming module before it is conveyed to the first and second topping cathode portions 204 and 214. This is done to control the cathode inlet temperature of the first and second topping cathode portions 204 and 214.

In one embodiment, a portion of the heated oxidant gas supplied by the oxidizer assembly 231, 233 before it is mixed with a second portion of preheated fresh air, is diverted to the cathode exhaust ducting 263 in the bottoming module. This is done to control the concentration of $CO_2$ in the heated oxidant gas that is supplied to the bottoming cathode portion 224. If the cathode inlet to the bottoming fuel cell module becomes too rich in $CO_2$, the $CO_2$ concentration in the cathode inlet gas supplied to the bottoming fuel cell modules may be modulated to minimize Ni dissolution by increasing the second portion of the preheated fresh air. The temperature of the cathode inlet to the bottoming fuel cell module is controlled by modulating the temperature of the preheated fresh air.

The concentration of $CO_2$ and temperature of the inlet oxidant gas conveyed to the first and second topping fuel cell modules 202, 212 and the bottoming module 222 may be adjusted and modulated. Control of these adjustments may be performed by a programmable controller 252 or similar device. For example, the cathode exhaust of the bottoming fuel cell module 222 may be diluted with fresh air in order to control the temperature and concentration of $CO_2$ in the inlet oxidant gas conveyed to the first and second topping fuel cell modules. If the cathode exhaust from the bottoming fuel cell module becomes too rich in $CO_2$, the $CO_2$ concentration in the cathode inlet gas supplied to the first and second topping fuel cell modules may be modulated to minimize Ni dissolution by diluting the bottoming fuel cell module's cathode exhaust with fresh air and/or controlling the amount of fresh air supplied to the oxidizer assembly 231, 233 and the amount of oxidant gas produced by the oxidizer 233 supplied to the bottoming fuel cell module.

In some embodiments, a cathode booster blower 242 may be placed in the cathode exhaust ducting 263 that conveys cathode exhaust from the bottoming module 222 to raise the pressure of the first and second topping cathode portions 204 and 214 in order to maintain required differential pressure between the anode and cathode portions in the first and second topping modules 202 and 212, respectively.

Similarly as described above with respect to the first topping fuel cell module 202, the bottoming fuel cell module 222 may include multiple bottoming fuel cell stacks, each having a cathode portion and an anode portion. The number of fuel cell stacks per module is determined based on the number needed to provide the desired power output and the efficiency. The fuel cell stacks 222a in the bottoming fuel cell module 222 may include high temperature molten carbonate fuel cells.

As shown in FIG. 1, the bottoming anode portion 226 of the bottoming fuel cell module 222 is operably coupled to each of the first topping anode portion 206 and the second topping anode portion 216 such that the bottoming anode portion 226 receives anode exhaust output from both the first and the second topping anode portions 206 and 216. The first topping anode portion 206 and the second topping anode portion 216 are therefore configured in a two-to-one ratio with the bottoming anode portion 226.

Furthermore, the total number of fuel cell stacks of the first and second topping fuel cell modules 202 and 212 are configured in a two-to-one ratio with the number of fuel cell stacks of the bottoming fuel cell module 222. In other embodiments, the number of topping modules and bottoming modules will vary, and the total number of topping fuel cell stacks and bottoming fuel cell stacks may also vary. For increased efficiency, the number of topping modules may be greater than the number of bottoming modules, and/or the total number of topping fuel cell stacks may be greater than the total number of bottoming fuel cell stacks. The topping modules or stacks have higher current density (because of better fuel quality) and fuel utilization than the bottoming modules or stacks.

During operation, the first and second topping fuel cell modules 202, 212 each receive a portion of the fuel feed, such as methane, natural gas, or other suitable fuel, from a fuel supply. Prior to being conveyed to the topping fuel cell modules 202, 212, the fuel feed may be preheated and/or processed. For example, a humidifier may be used to humidify the fuel feed and a preconverter 234 may be used to partially reform some of the fuel feed externally of the topping fuel cell modules. Moreover, the fuel feed may be deoxidized in a deoxidizer, desulfurized in a desulfurizer (not shown) and/or undergo other processing as may be required to meet fuel cell specifications for purity. Preheated and/or processed fuel feed is then divided between the first and second topping fuel cell modules 202, 212, with the first topping fuel cell module 202 receiving a first portion of the fuel feed and the second topping fuel cell module 212 receiving a second portion of the fuel feed, and the first and second portions of the fuel feed may be controlled to be about the same or to be different in amount. The controller 252 may be used to control the respective amounts of the first and second fuel feeds supplied to the first and second topping fuel cell modules 202, 212. The fuel feed portions received in each of the first and second topping fuel cell modules 202, 212 are then pre-heated using cathode exhaust heat output from the respective topping fuel cell module in first and second heat exchangers 236, 238, respectively. In some embodiments the heat exchangers 236 and 238 can be combined into one heat exchanger. In each of the first and second fuel cell modules 202, 212, the pre-heated fuel feed portion is then conveyed to the topping anode portion 206, 216 of the one or more fuel cell stacks of the respective topping module and may be reformed in an indirect internal reformer 248, 250 before being conveyed to the respective topping anode portion 206, 216.

The first and second topping fuel cell modules 202, 212 consume a portion of the fuel contained in the respective fuel feed portions conveyed to the topping fuel cell module, so that the anode exhaust output from the first and second topping modules 202, 212 contains the remaining fuel portion therein. In the embodiment shown in FIG. 1, the first and second fuel cell modules 202, 212 consume about two-thirds of the fuel in the fuel feed, and output anode exhaust containing the remaining portion of fuel, which is about one third of the initial fuel in the fuel feed. In FIG. 1, the fuel cell system 200 includes an anode booster blower 232 which is disposed downstream from the first and second topping fuel cell modules 202, 212 and upstream of the bottoming fuel cell module 222. The anode booster blower 232 receives anode exhaust output from the first and second topping anode portions 206, 216 and increases the pressure of the anode exhaust before it is conveyed to the bottoming fuel cell module 222. The anode booster blower 232 operates with a low pressure increase, resulting in low compression power and low cost. The anode booster blower 232 operation may be controlled by the controller 252 so as to control the differential pressure between the anode and cathode portions of the first and second topping fuel cell modules 202 and 212 respectively.

As further shown in FIG. 1, before being received into the anode booster blower 232, the anode exhaust output from the first and second topping fuel cell modules 202, 212 may be diverted to a water recovery unit 268. The water recovery unit 268 recovers water contained in the received anode exhaust 267 and outputs a water stream 270. The water-depleted anode exhaust output 269 is then conveyed to an electrochemical hydrogen separation (EHS) unit 271 (also referred to as a "$CO_2$ separation unit"). The EHS unit 271 produces a hydrogen-rich stream 272. The hydrogen-rich stream 272 may be in the form of hydrogen or syngas that is suitable for export as a feed supply for chemical and/or metallurgical processes that require hydrogen (e.g., Fischer-Tropsch reactions, hydrogenation, iron and steel industry processes that require reducing gas, copper, and nickel production). Alternatively, the hydrogen-rich stream 272 may be used as fuel for another fuel cell system for supplemental power generation for the system 200. The fuel cells may be low temperature fuel cells (e.g., proton exchange membrane (PEM) fuel cells, phosphoric acid fuel cells) and/or high temperature fuel cells (e.g., MCFC, solid oxide fuel cells).

The hydrogen-depleted, $CO_2$-rich stream 273 produced by the EHS unit 271 is conveyed back to the anode booster blower 232. The stream 273 is rich in carbon dioxide, which is fed to the anode portion 226 of the bottoming fuel cell module 222. In some embodiments, when supplemental fuel is supplied to the anode portion 226 of the bottoming fuel cell module 222, a first portion of the hydrogen-depleted stream 273 may be returned to the anode booster blower 232, while a second portion of the hydrogen-depleted stream 273 may be exported from the system 200 for other uses.

The controller 252 may control the system 200 such that hydrogen or syngas is produced as the hydrogen-rich stream 272 based on the flow provided to the topping modules. In addition, the controller 252 may increase the fuel flow to the humidifier and pre-converter 234 if it is determined that there is an increased need for hydrogen or syngas. The controller 252 may also regulate how much anode exhaust output is diverted to the water recovery unit 269 as received anode exhaust 267. In some embodiments, the controller 252 is configured to allow the entire flow of the anode exhaust output to be diverted to the water recovery unit 269 to remove water before the hydrogen-depleted stream 273 is conveyed back to the anode booster blower 232. In such embodiments, this would allow the anode booster blower 232 to operate as a low-temperature blower rather than a high-temperature blower.

As shown in FIG. 1, anode exhaust supplied to the bottoming fuel cell module 222 by the anode booster blower 232 may be supplemented with fresh supplemental fuel from supplemental fuel supply 251. The supplemental fresh fuel may be mixed with the anode exhaust without requiring any additional water to humidify the fuel since the anode exhaust stream from the first and second topping fuel cell modules 202, 212 includes adequate amounts of water. The amount of fresh fuel supplied to the bottoming fuel cell module may be controlled by the controller 252 so as to achieve a desired fuel utilization and current generation in the bottoming fuel cell module. The supplemental fresh fuel may be supplied from the same fuel supply as the topping fuel cell modules, or may be supplied from a different fuel supply. In some embodiments, the supplemental fresh fuel comprises a reformable fuel such as methane.

Anode inlet gas comprising anode exhaust from the topping fuel cell modules and optionally supplemental fresh fuel is received in the bottoming fuel cell module 222 and is conveyed to the bottoming anode portion 226 of the fuel cell stack or stacks in the bottoming fuel cell module. As discussed above, the anode inlet gas may be reformed through direct internal reforming in the bottoming anode portion, and anode exhaust produced by the bottoming anode portion is output from the bottoming fuel cell stack or stacks via the anode outlet manifold 230. Anode exhaust output from the bottoming fuel cell module 222 is conveyed to the anode oxidizer assembly that includes a mixer/eductor 231 and the oxidizer 233. The mixer/eductor 231 also receives a first portion of pre-heated air input into the system and mixes the anode exhaust with the pre-heated air, and the oxidizer 233 oxidizes the anode exhaust with the pre-heated air to output a high temperature oxidant gas suitable for use in a fuel cell cathode. As shown in FIG. 1, the high temperature oxidant gas output from the oxidizer 233 is combined with a second portion of the pre-heated air to form cathode inlet gas which is then input into the bottoming cathode portion 224 of the bottoming module 222. The amount of the first portion of pre-heated air provided to the mixer/eductor 231 is controlled by the controller 252. The amount of pre-heated air provided to the mixer/eductor 231 is controlled so as to control the temperature of the inlet oxidant gas to the bottoming cathode portion 224 and to control the temperature of the cathode exhaust output from the bottoming cathode portion 224.

In one embodiment, a portion of the heated oxidant gas supplied by the oxidizer assembly 231, 233 before it is mixed with a second portion of preheated fresh air, is diverted to the cathode exhaust ducting 263 in the bottoming module via ducting 265. This is done to control the concentration of $CO_2$ in the heated oxidant gas that is supplied to the bottoming cathode portion 224. If the cathode inlet to the bottoming fuel cell module becomes too rich in $CO_2$, the $CO_2$ concentration in the cathode inlet gas supplied to the bottoming fuel cell modules may be modulated to minimize Ni dissolution by increasing the second portion of the preheated fresh air. The temperature of the cathode inlet to the bottoming fuel cell module is controlled by modulating the temperature of the preheated fresh air.

Cathode exhaust ducting 263, in the bottoming module also includes a heat exchanger 264 to cool down the cathode exhaust from the bottoming module before it is conveyed to the first and second topping cathode portions 204 and 214. This is done to control the cathode inlet temperature of the first and second topping cathode portions 204 and 214.

As can be seen in FIG. 1, fresh air is supplied to the system 200 using a blower 245. A first portion of the air, which may include all or a portion of the air supplied by the blower 245, is conveyed to a heat exchanger 246 for heating. The cathode exhaust 208 and 218 from the first and second topping modules 202 and 212, respectively, is used to heat the first portion of air in the heat exchanger 246. In some embodiments, some or all of the first air portion may be bypassed around the heat exchanger 246 via a bypass line 246a, and the amount of air bypassed around the heat exchanger 246 may be controlled by the controller 252 and will depend on the desired temperature of the inlet oxidant gas input into the bottoming cathode portion 224 and the desired temperature of the cathode inlet of the topping cathode portions 202 and 212. An air heater 266, is positioned downstream of the heat exchanger 246 to heat the first portion of air in certain modes of operation, such as when the system is heating up or not producing power or at low output. The air heater 266 may be a natural gas fired heater or an electric heater. The output of the air heater 266 is controlled by the controller 252 depending on the desired temperature of the inlet oxidant gas input into the bottoming cathode portion 224 and the desired temperature of the cathode inlet of the topping cathode portions 202 and 212. In this way, the controller 252 is able to control the temperature of the inlet oxidant gas conveyed to the bottoming cathode portion 224 and the temperature of the cathode inlet oxidant gas conveyed to the topping cathode portions 204 and 214, and thus, the temperature in the fuel cell stacks 202a, 212a, and 222a of the topping modules 202, 212, and bottoming module 222, respectively.

As shown in FIG. 1, a first portion of the pre-heated air output from the air heater 266 is conveyed to the anode oxidizing assembly 231, 233 for oxidizing the anode exhaust, as discussed above, and the second portion of pre-heated fresh air is conveyed to the bottoming cathode portion 224. As shown and discussed above, the remaining pre-heated air is combined with the oxidant gas output from the oxidizer 233 before being input into the bottoming cathode portion 224. Before oxidant gas output from the oxidizer 233 mixes with the second portion of the preheated fresh air, a portion of the oxidant gas output from the oxidizer 233 is conveyed to the cathode exhaust duct 263 from the bottoming modules via the bypass duct 265. This is done to reduce the concentration of $CO_2$ in the oxidant inlet gas input into the bottoming cathode portion 224. The diversion of the oxidant gas from the oxidizer 233 to the topping modules is controlled by the controller 252 or similar device.

Before oxidant gas output from the oxidizer 233 mixes with the second portion of the preheated fresh air, the cathode exhaust portion from the bottoming module is cooled in a heat exchanger 264, using the second portion of preheated fresh air. This is done to control the cathode inlet temperature of the cathode inlet portion 204 and 214 of the first and second topping modules, respectively.

In such embodiments, all or a portion of the cathode exhaust output from the bottoming module 222 would be conveyed through the heat exchanger 264 and some of the heat in the cathode exhaust would be used to pre-heat the second portion of preheated fresh air being conveyed along with the output of the anode exhaust oxidizer 233 to the inlet of cathode portion 224 of the bottoming module 222. The amount of air supplied to the heat exchanger 264 is adjustable by the controller 252 so as to control the cathode inlet temperature of the first and second topping modules. The amount of cathode exhaust conveyed to the heat exchanger 264 may also be controlled by the controller 252 or similar device by controlling a valve 264a so as to control the cathode inlet temperature of the oxidant gas entering the topping modules. The heat exchanger may be located in the bottoming module 222.

Cathode exhaust output from the bottoming cathode portion 224 is then conveyed to the first and second topping modules 202, 212 for use as oxidant gas in the first and second topping cathode portions 204, 214. The system 200 may also include a cathode exhaust booster 242 provided on the cathode side downstream from the bottoming module 222 and upstream from the topping modules 202, 212 for increasing the pressure of the cathode exhaust output from the bottoming module 222 before being conveyed to the topping modules. In this way, the pressure differential between the anode side and the cathode side in the topping modules may be adjusted and controlled so as to maintain a low differential pressure between the cathode and the anode sides. The controller 252 or similar control device may be used for controlling the operation of the cathode exhaust booster so as to control the differential pressure between the anode and cathode sides.

The cathode exhaust output from the bottoming cathode portion 224 may be divided about equally between the first and second topping cathode portions 204, 214. However, in some embodiments, the amount of cathode exhaust from the bottoming cathode portion 224 received by each of the first and second topping cathode portions 204, 214 may be varied and controlled based on the desired operation and fuel utilization in the topping first and second topping modules 202, 212.

As shown in FIG. 1, some of the air supplied by the blower 245 may be bypassed around the bottoming fuel cell module 222 and may be supplied as supplemental oxidant gas to the first and second topping fuel cell modules 202, 212. Specifically, a third portion of the air from the blower 245 is conveyed via a bypass duct 252 to the first topping fuel cell module 202 for use in the first topping cathode portion 204, and a fourth portion of the air from the blower 245 is conveyed via a bypass duct 261 to the second topping cathode portion 214. As shown, the third air portion is combined with a portion of the cathode exhaust from the bottoming cathode portion 224 prior to being input into the first topping cathode portion 204, while the fourth air portion is combined with the remaining portion of the cathode exhaust from the bottoming cathode portion 224 prior to being input into the second topping cathode portion 214. The amounts of third and fourth air portions conveyed to the first and second topping cathode portions, respectively, is controlled by the controller 252 via suitable valves 262a, 261a so as to control the cathode inlet temperature of the inlet oxidant gas entering the topping modules.

After undergoing an electrochemical reaction in the topping fuel cells, spent oxidant is output from the first and second topping cathode portions 204, 214 as cathode exhaust. As discussed above, waste heat from cathode exhaust output from the first topping cathode portion 204 is used for pre-heating a portion of the fuel feed in the heat exchanger 236, and waste heat from the cathode exhaust output from the second topping cathode portion 214 is used to pre-heat the other portion of the fuel feed in the heat exchanger 238. After being output from the first and second topping modules 202, 212, cathode exhaust streams may be combined and conveyed to the fuel humidifier (not shown), which also receives fuel feed and water and where waste heat from the cathode exhaust is used to form steam and to humidify the fuel feed with the steam. The cathode exhaust may also be conveyed to the heat exchanger 246 so that waste heat remaining in the cathode exhaust is used for pre-heating incoming air.

In the embodiment shown in FIG. 1, the system 200 includes a water recovery assembly 260 for recovering water from the cathode exhaust. After the waste heat in the cathode exhaust is recovered in the heat exchangers 236, 238, the fuel humidifier (not shown in FIG. 1) and/or the heat exchanger 246, cooled cathode exhaust may be conveyed to the water recovery assembly 260, which recovers water from the cathode exhaust. Water recovered in the water recovery assembly 260 may be re-used in the fuel cell system 200 for humidifying the fuel feed. As shown in FIG. 1, water separated cathode exhaust is then output from the system 200 by venting or the like.

As a further modification of the system shown in FIG. 1, cathode water recovery may be eliminated since water is now also recovered from the anode exhaust. If cathode exhaust water recovery is not pursued, the exhaust may be diverted to a heat recovery unit (HRU) 275. The remaining heat present in the exhaust may be used to generate hot water using the HRU 275 by warming an incoming water stream 276 and producing a hot water stream 277. The resulting hot water stream 277 may then be used for other purposes, such as for industrial or residential needs. In other embodiments, an ORC unit may be provided in place of an HRU allowing for the generation of additional power using the remaining heat in the exhaust. The controller 252 may be configured to regulate the amount of exhaust diverted to the HRU or ORC unit 275 in order to control the temperature of the hot water stream 277 or the power generated by the ORC unit. Alternately, if cathode exhaust water recovery is pursued, a condensing heat exchanger (not shown in FIG. 1) may be used to recover water while warming a water stream for industrial or residential purposes. In other embodiments, an ORC may be coupled with the condensing heat exchanger. In such cases, the HRU or ORC unit 275 may be eliminated.

Second Embodiment

Figure 2:
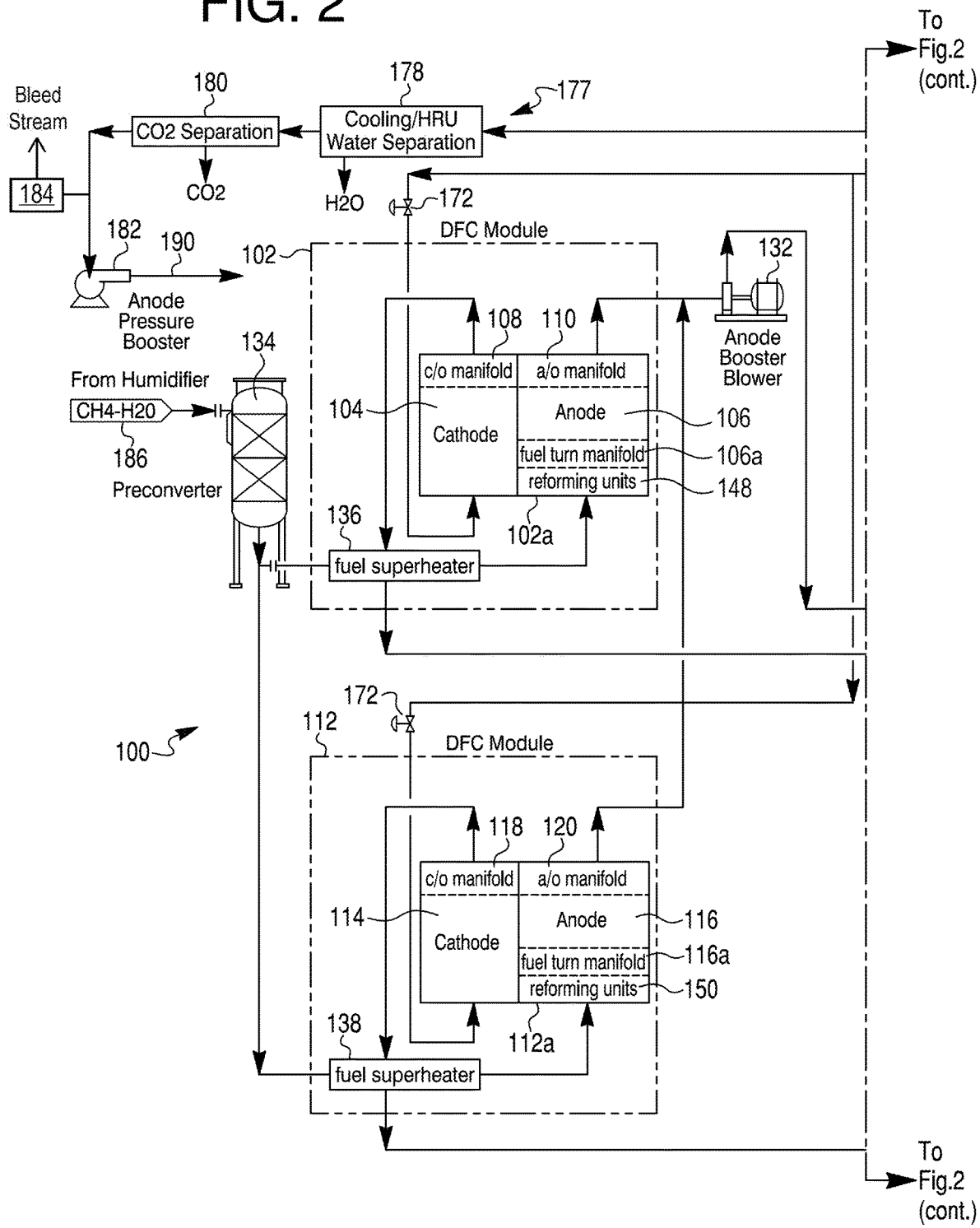
FIG. 2 shows a high efficiency fuel cell system with hydrogen and syngas export according to another embodiment.
Figure 2:
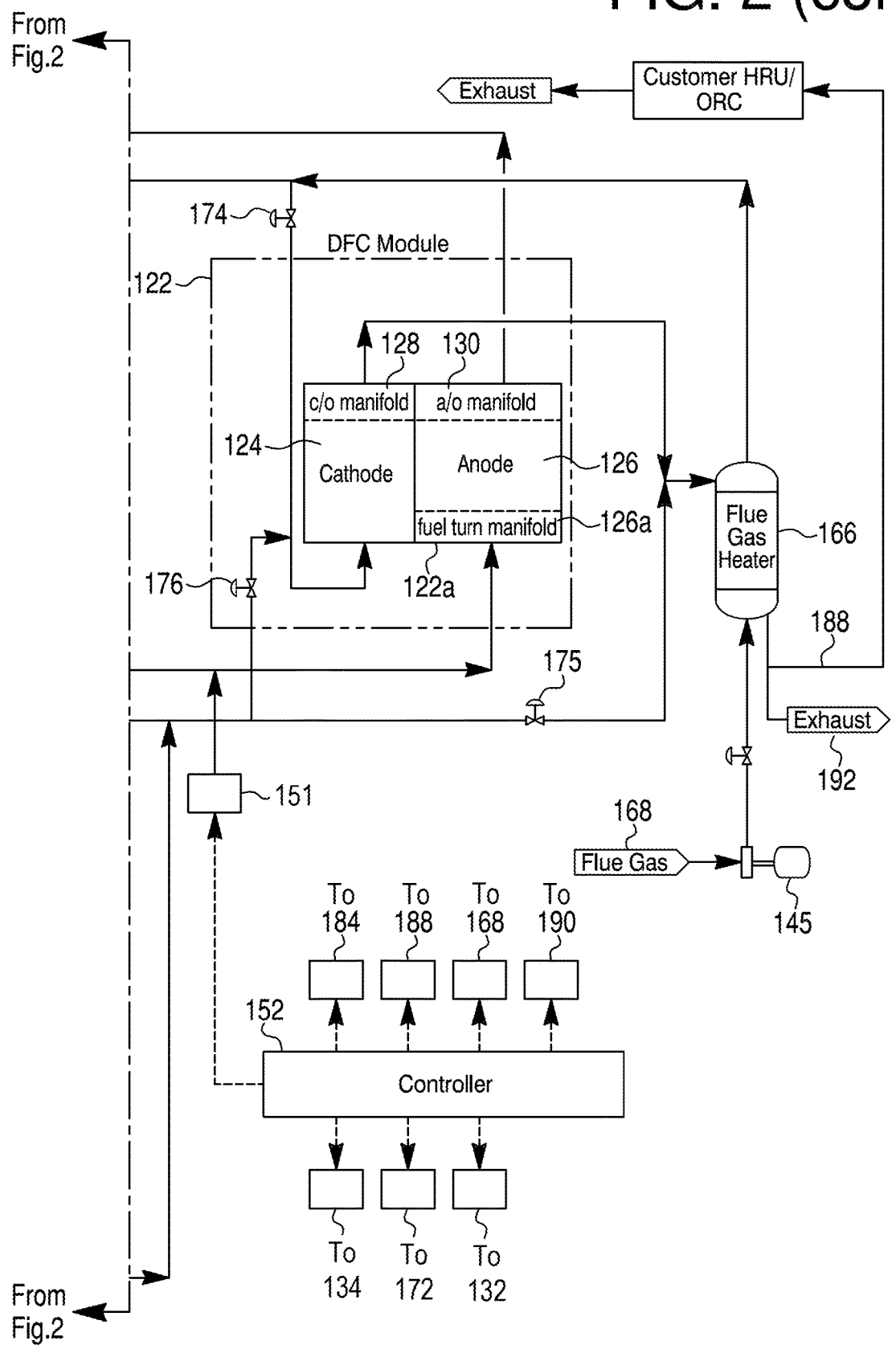

FIG. 2 schematically shows a modular fuel cell system 100 according to a second embodiment of the present invention. The fuel cell system 100 is a high efficiency fuel cell system such as the fuel cell systems disclosed in U.S. patent application Ser. No. 14/732,032, filed Jun. 5, 2014, which is incorporated herein by reference in its entirety. As shown in FIG. 2, the system 100 allows for the exportation of a highly pure hydrogen stream from the system 100 after carbon removal is performed on the anode exhaust output from the bottoming fuel cell assembly. In addition, the system 100 may improve thermal efficiency by diverting exhaust from the system 100 to a heat recovery unit to produce hot water that can meet industrial or residential needs or to generate power using an Organic Rankine Cycle (ORC) system.

Like the system 200 shown in FIG. 1, the system 100 includes a topping fuel cell assembly and a bottoming fuel cell assembly. The topping fuel cell assembly may include first and second topping fuel cell modules 102, 112, while the bottoming fuel cell assembly may include a bottoming fuel cell module 122, providing a 2-to-1 ratio of topping fuel cell modules to bottoming fuel cell modules.

During operation, flue gas generated and outputted from a flue gas generating system is supplied to the system 100 via a flue gas input 168. The amount of flue gas supplied to the system 100 via the flue gas input 168 is controllable via the controller 152. The flue gas is heated using waste heat from cathode exhaust output from the topping and bottoming fuel cell modules in the flue gas heater 166. The heated flue gas is then provided to the topping and bottoming fuel cell modules 102, 112, 122 either in parallel or in series for use as cathode oxidant gas. As described herein below, during operation of the system 100, carbon dioxide in the flue gas used as cathode oxidant gas is extracted in the topping and bottoming fuel cell modules and output with anode exhaust from the bottoming fuel cell module so that the carbon dioxide can be separated out from the system.

Also during operation of the system of FIG. 2, the first and second topping fuel cell modules 102, 112 each receive a portion of the fuel feed, such as methane, natural gas, or other suitable fuel, from the fuel supply 186. Prior to being conveyed to the topping fuel cell modules 102, 112, the fuel feed may be preheated and/or processed. For example, a humidifier may be used to humidify the fuel feed and the preconverter 134 may be used to partially reform some of the fuel feed externally of the topping fuel cell modules. Moreover, the fuel feed may be deoxidized in a deoxidizer, desulfurized in a desulfurizer (not shown) and/or undergo other processing as may be required to meet fuel cell specifications for purity. Preheated and/or processed fuel feed is then divided between the first and second topping fuel cell modules 102, 112, with the first topping fuel cell module 102 receiving a first portion of the fuel feed and the second topping fuel cell module 112 receiving a second portion of the fuel feed, and the first and second portions of the fuel feed may be controlled to be about the same or to be different in amount. The controller 152 may be used to control the respective amounts of the first and second fuel feed portions supplied to the first and second topping fuel cell modules 102, 112 from the preconverter 134. The fuel feed portions received in each of the first and second topping fuel cell modules 102, 112 are then pre-heated using cathode exhaust heat conveyed from the respective topping fuel cell module in first and second heat exchangers 136, 138 (fuel superheaters), respectively. The fuel superheaters 136 and 138 in the examples are located within the stack modules and are separate units. In some embodiments the heat exchangers 136, 138 are located outside the module enclosure and can be combined into one heat exchanger. In each of the first and second fuel cell modules 102, 112, the pre-heated fuel feed portion is then conveyed to the topping anode portion 106, 116 of the one or more fuel cell stacks of the respective topping module and may be reformed in an indirect internal reformer 148, 150 before being conveyed to the respective topping anode portion 106, 116.

The first and second topping fuel cell modules 102, 112 consume a portion of the fuel contained in the respective fuel feed portions conveyed to the topping fuel cell module, so that the anode exhaust conveyed from the first and second topping modules 102, 112 contains the remaining fuel portion therein. The first and second fuel cell modules 102, 112 consume about two-thirds of the fuel in the fuel feed, and convey anode exhaust containing the remaining portion of fuel, which is about one third of the initial fuel in the fuel feed. During the electrochemical reaction in the first and second fuel cell modules 102, 112, $CO_2$ present in the cathode oxidant stream (flue gas) being conveyed through the respective topping cathode portions 104, 114 is extracted and conveyed across the electrolyte matrix to the respective topping anode portions. As a result, anode exhaust output from the anode topping portions includes not only the remaining unutilized fuel but also $CO_2$ extracted from the cathode oxidant stream of the topping cathode portions 104, 114.

In FIG. 2, the fuel cell system 100 may include an anode booster blower 132 which is disposed downstream from the first and second topping fuel cell modules 102, 112 and upstream of the bottoming fuel cell module 122. The anode booster blower 132 receives anode exhaust conveyed from the first and second topping anode portions 106, 116 and increases the pressure of the anode exhaust before it is conveyed to the bottoming fuel cell module 122. The anode booster blower 132 operates with a low pressure increase, resulting in low compression power and low cost. The anode booster blower 132 operation may be controlled by the controller 152 so as to control the differential pressure between the anode and cathode portions of the first and second topping fuel cell modules and the bottoming fuel cell module 102, 112, and 122, respectively. In this system, the anode to cathode differential pressure of both the topping and the bottoming fuel cell modules, 102, 112 and 122 can be affected by the booster blower 132. When the differential pressure between the anode and cathode portions of the topping fuel cell module or modules and the bottoming fuel cell module is balanced by the controller 152, the anode booster blower 132 will operate at a steady condition without change.

As shown in FIG. 2, anode exhaust supplied to the bottoming fuel cell module 122 by the anode booster blower 132 may be supplemented with fresh supplemental fuel from supplemental fuel supply 151. The supplemental fresh fuel may be mixed with the anode exhaust without requiring any additional water to humidify the fuel since the anode exhaust stream from the first and second topping fuel cell modules 102, 112 includes adequate amounts of water. The amount of fresh fuel supplied to the bottoming fuel cell module may be controlled by the controller 152 so as to achieve a desired fuel utilization and current generation in the bottoming fuel cell module. The supplemental fresh fuel may be supplied from the same fuel supply as the topping fuel cell modules, or may be supplied from a different fuel supply. In some embodiments, the supplemental fresh fuel comprises a reformable fuel such as methane.

Anode inlet gas comprising anode exhaust from the topping fuel cell modules and optionally supplemental fresh fuel is received in the bottoming fuel cell module 122 and is conveyed to the bottoming anode portion 126 of the fuel cell stack(s) in the bottoming fuel cell module via the fuel turn manifold 126A. As discussed above, the anode inlet gas may be reformed through direct internal reforming in the bottoming anode portion. During the electrochemical reaction in the bottoming fuel cell module, fuel in the anode inlet gas reacts with cathode oxidant gas (portion of flue gas) conveyed through the bottoming cathode portion, and $CO_2$ present in the cathode oxidant gas is extracted and conveyed through the electrolyte matrix to the bottoming anode portion. As a result, anode exhaust produced by and output from the bottoming anode portion will include $CO_2$ that was already present in the anode inlet gas as well as $CO_2$ extracted from the cathode oxidant gas. That is, the anode exhaust output from the bottoming anode portion 126 will include the $CO_2$ initially present in the fuel feed, the $CO_2$ extracted from the cathode oxidant gas conveyed through the topping cathode portions 104, 114 and present in the anode inlet gas input into the bottoming anode portion 126, and the $CO_2$ extracted from the cathode oxidant gas conveyed through the bottoming cathode portion 124. The anode exhaust from the bottoming anode portion 126 further includes water and unutilized fuel.

Anode exhaust produced by the bottoming anode portion is conveyed via the anode outlet manifold 130 from the bottoming fuel cell stack(s) and is output from the bottoming fuel cell module 122 to the separation assembly 177. In the separation assembly 177 of FIG. 2, the anode exhaust is conveyed to a condenser 178 that removes water from the anode exhaust and conveys water-depleted anode exhaust to the $CO_2$ separation assembly 180. The $CO_2$ separation assembly 180 separates and removes most of the carbon dioxide from the dry anode exhaust and recycles the dry separated anode exhaust having a reduced amount of carbon dioxide. In one embodiment, this dry separated anode exhaust is used in the topping fuel cell modules 102, 112 via the anode pressure booster 182. In this embodiment, a small portion of the dry separated anode exhaust may be bled off via the valve 184, which is controllable by the controller 152, so as to prevent accumulation of inert gases before the dry separated anode exhaust is provided to the anode pressure booster 182. The anode pressure booster 182 increases the pressure of the recycled dry separated anode exhaust stream and conveys it to be mixed with the fresh fuel supplied by the fuel supply 186. Alternatively, the recycled dry separated anode exhaust stream is bypassed around the preconverter 134 to be mixed with partially reformed fuel output from the preconverter. In these embodiments, with the recycled fuel stream, system 100 can achieve a very high fuel utilization and efficiency.

The anode exhaust output from the bottoming anode portion may contain about 53% carbon dioxide, 42% water vapor, and a mixture of about 5% of hydrogen and carbon monoxide, e.g., syngas. As shown in FIG. 2, the separation assembly 177 separates the different components of the anode exhaust and in the illustrative configuration of FIG. 2, comprises a condenser 178 (i.e., a water recovery assembly) and a $CO_2$ separation assembly 180.

The condenser 178 cools and condenses the anode exhaust from the bottoming fuel cell module 122 to separate water from the anode exhaust. The condenser 178 outputs dry anode exhaust (water separated anode exhaust) to the $CO_2$ separation assembly 180. For example, the dry anode exhaust will contain about 90% carbon dioxide and 9% hydrogen, as well as additional inert gases. The $CO_2$ separation assembly 180 removes carbon dioxide from the dry anode exhaust so that the resulting dry separated anode exhaust has a substantially reduced amount of carbon dioxide and has a composition similar to that of the fuel input to the first and second topping anode portions 106, 116 after reforming. The $CO_2$ separation assembly 180 removes the carbon dioxide from the dry anode exhaust using one or more separation processes such as compression and cooling to cryogenic carbon dioxide, solvent washing, or a membrane process. The dry separated anode exhaust is conveyed from the $CO_2$ separation assembly 180 to an anode pressure booster 182, which increases the pressure of the separated exhaust stream before the separated exhaust stream is exported from the system 100 as a hydrogen-rich stream 190. The hydrogen-rich stream 190 may be in the form of hydrogen or syngas that is suitable for export as a feed supply for chemical and/or metallurgical processes that require hydrogen (e.g., Fischer-Tropsch reactions, hydrogenation, iron and steel industry processes that require reducing gas, copper, and nickel production). Alternatively, the hydrogen-rich stream 190 may be used as fuel for another fuel cell system for supplemental power generation for the system 100. The fuel cells may be low temperature fuel cells (e.g., proton exchange membrane (PEM) fuel cells, phosphoric acid fuel cells) and/or high temperature fuel cells (e.g., MCFC, solid oxide fuel cells). In addition, by exporting the separated exhaust stream as the hydrogen-rich stream 190, a need for placing a bleed valve between the $CO_2$ separation assembly 180 and the anode pressure booster 182 is no longer necessary as there is no risk that inert gases, such as nitrogen, remaining in the hydrogen-rich stream 190 will accumulate in the system 100 due to the recycling of the separated exhaust stream back into the topping fuel cell modules 102, 112.

As further shown in FIG. 2, cathode exhaust from the topping and bottoming fuel cell modules 102, 112, 122 passes through the flue gas heater 166 where waste heat present in the cathode exhaust heats the flue gas input into the system 100. After passing through the flue gas heater 166, the cooled cathode exhaust may be output and exhausted out of the system via an exhaust outlet 192. In addition, as shown in FIG. 2, after passing through the flue gas heater 166, the cooled cathode exhaust may be diverted to a heat recovery unit (HRU) via ducting 188. The remaining heat present in the exhaust may be used to generate hot water using the HRU by warming incoming water. The resulting hot water may then be used for other purposes, such as for industrial or residential needs. In other embodiments, an ORC unit may be provided in place of an HRU allowing for the generation of additional power using the remaining heat in the exhaust.

The controller 152 may control the system 100 such that hydrogen or syngas is produced as the hydrogen-rich stream 190 based on the flow provided to the topping modules. In addition, the controller 152 may increase the fuel flow to the humidifier and pre-converter 134 if it is determined that there is an increased need for hydrogen or syngas. The controller 152 may also be configured to regulate the amount of exhaust 188 diverted to the HRU or ORC unit in order to control the temperature of the hot water or the power generated by the ORC unit.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A fuel cell system comprising:
   a first topping fuel cell module comprising a first topping anode portion configured to output a first topping anode exhaust comprising hydrogen, and a first topping cathode portion configured to output a first topping cathode exhaust;
   a second topping fuel cell module comprising a second topping anode portion configured to output a second topping anode exhaust comprising hydrogen, and a second topping cathode portion configured to output a second topping cathode exhaust;
   at least one bottoming fuel cell module comprising a bottoming anode portion configured to output a bottoming anode exhaust, and a bottoming cathode portion configured to output a bottoming cathode exhaust; and
   an electrochemical hydrogen separation unit configured to receive the first topping anode exhaust and the second topping anode exhaust, to output a hydrogen-rich stream, and to output a $CO_2$-rich stream;
   wherein the bottoming anode portion is configured to receive the $CO_2$-rich stream from the electrochemical hydrogen separation unit.

2. The fuel cell system of claim 1, further comprising:
   a water recovery unit configured to receive the first topping anode exhaust, to separate water contained in the first topping anode exhaust, to output a water stream, and to output water-depleted topping anode exhaust;
   wherein the at least a portion of the first topping anode exhaust received by the electrochemical hydrogen separation unit is the water-depleted topping anode exhaust from the water recovery unit.

3. The fuel cell system of claim 1, further comprising a controller configured to control an amount of the first topping anode exhaust that is diverted to the electrochemical hydrogen separation unit.

4. The fuel cell system of claim 1, wherein the electrochemical hydrogen separation unit is configured to receive an entirety of the first topping anode exhaust from the first topping fuel cell module.

5. The fuel cell system of claim 1, further comprising a heat recovery unit configured to:
   receive the first topping cathode exhaust and an incoming water stream,
   heat the incoming water stream using heat in the first topping cathode exhaust, and
   output a hot water stream.

6. The fuel cell system of claim 1, further comprising an Organic Rankine Cycle system configured to receive the first topping cathode exhaust, and to generate power using heat in the first topping cathode exhaust.

7. The fuel cell system of claim 1, wherein a total number of topping fuel cell stacks in the system is greater than a total number of bottoming fuel cell stacks in the system.

8. The fuel cell system of claim 1, further comprising:
   a heat exchanger configured to:
   receive the bottoming cathode exhaust,
   cool the bottoming cathode exhaust, and
   output a cooled bottoming cathode exhaust;
   wherein the first topping cathode portion is configured to receive the cooled bottoming cathode exhaust from the heat exchanger.

9. The fuel cell system of claim 8, wherein the at least one bottoming fuel cell module further comprises:
   an oxidizer assembly configured to:
   receive the bottoming anode exhaust,
   oxidize the bottoming anode exhaust, and
   output an oxidant gas;
   wherein the bottoming cathode portion is configured to receive the oxidant gas from the oxidizer assembly.

10. The fuel cell system of claim 1, wherein the at least one bottoming fuel cell module further comprises:
    an oxidizer assembly configured to:
    receive the bottoming anode exhaust,
    oxidize the bottoming anode exhaust, and
    output an oxidant gas;
    wherein the bottoming cathode portion is configured to receive the oxidant gas from the oxidizer assembly.

11. A method comprising:
    operating a fuel cell system that comprises:
    a first topping fuel cell module comprising a first topping anode portion configured to output a first topping anode exhaust comprising hydrogen, and a first topping cathode portion configured to output a first topping cathode exhaust,
    a second topping fuel cell module comprising a second topping anode portion configured to output a second topping anode exhaust comprising hydrogen, and a second topping cathode portion configured to output a second topping cathode exhaust,
    at least one bottoming fuel cell module comprising a bottoming anode portion configured to output a bottoming anode exhaust, and a bottoming cathode portion configured to output a bottoming cathode exhaust, and an electrochemical hydrogen separation unit;
wherein the step of operating the fuel cell system comprises:
   at the electrochemical hydrogen separation unit, receiving at least a portion of the first topping anode exhaust from the first topping fuel cell module and the second topping anode exhaust from the second topping fuel cell module, outputting a hydrogen-rich stream, and outputting a $CO_2$-rich stream; and
   at the bottoming anode portion, receiving the $CO_2$-rich stream from the electrochemical hydrogen separation unit.

12. A fuel cell system comprising:
a first topping fuel cell module comprising a first topping anode portion configured to output a first topping anode exhaust comprising $CO_2$ and hydrogen, and a first topping cathode portion configured to output a first topping cathode exhaust;
a second topping fuel cell module comprising a second topping anode portion configured to output a second topping anode exhaust comprising $CO_2$ and hydrogen, and a second topping cathode portion configured to output a second topping cathode exhaust;
at least one bottoming fuel cell module comprising a bottoming anode portion configured to receive the first topping anode exhaust and the second topping anode exhaust and to output a bottoming anode exhaust, and a bottoming cathode portion configured to output a bottoming cathode exhaust; and
a $CO_2$ separation assembly configured to receive the bottoming anode exhaust, to output a hydrogen-rich stream, and to output a $CO_2$-rich stream.

13. The fuel cell system of claim 12, further comprising:
a condenser configured to receive the bottoming anode exhaust, to separate water contained in the bottoming anode exhaust, to output a water stream, and to output water-depleted bottoming anode exhaust;
wherein the bottoming anode exhaust received by the $CO_2$ separation assembly is the water-depleted bottoming anode exhaust from the condenser.

14. The fuel cell system of claim 12, further comprising:
a flue gas input configured to receive flue gas from a flue gas generating system and to output the flue gas to the first topping cathode portion and the bottoming cathode portion; and
a controller configured to control an amount of the flue gas output to the first topping cathode portion and the bottoming cathode portion.

15. The fuel cell system of claim 12, wherein the first topping anode portion is configured to receive the hydrogen-rich stream from the $CO_2$ separation assembly.

16. The fuel cell system of claim 15, further comprising:
a bleed valve configured to allow a portion of the hydrogen-rich stream from the $CO_2$ separation assembly to be bled off; and
a controller configured to control the bleed valve.

17. The fuel cell system of claim 12, further comprising a heat recovery unit configured to:
receive the first topping cathode exhaust, the bottoming cathode exhaust, and an incoming water stream,
heat the incoming water stream using heat in the first topping cathode exhaust and the bottoming cathode exhaust, and
output a hot water stream.

18. The fuel cell system of claim 12, further comprising an Organic Rankine Cycle system configured to receive the first topping cathode exhaust and the bottoming cathode exhaust, and to generate power using heat in the first topping cathode exhaust and the bottoming cathode exhaust.

19. The fuel cell system of claim 12, wherein a total number of topping fuel cell stacks in the system is greater than a total number of bottoming fuel cell stacks in the system.

20. A method comprising:
operating a fuel cell system that comprises:
   a first topping fuel cell module comprising a first topping anode portion configured to output a first topping anode exhaust comprising $CO_2$ and hydrogen, and a first topping cathode portion configured to output a first topping cathode exhaust,
   a second topping fuel cell module comprising a second topping anode portion configured to output a second topping anode exhaust comprising $CO_2$ and hydrogen, and a second topping cathode portion configured to output a second topping cathode exhaust,
   at least one bottoming fuel cell module comprising a bottoming anode portion configured to receive the first topping anode exhaust and the second topping anode exhaust and to output a bottoming anode exhaust, and a bottoming cathode portion configured to output a bottoming cathode exhaust, and
   a $CO_2$ separation assembly;
wherein the step of operating the fuel cell system comprises, at the $CO_2$ separation assembly, receiving the bottoming anode exhaust from the at least one bottoming fuel cell module, outputting a hydrogen-rich stream, and outputting a $CO_2$-rich stream.

* * * * *